(12) United States Patent
Yoshida et al.

(10) Patent No.: US 7,457,103 B2
(45) Date of Patent: Nov. 25, 2008

(54) SOLID ELECTROLYTIC CAPACITOR WHICH CAN EASILY BE LOWERED IN ESL

(75) Inventors: Katsuhiro Yoshida, Sendai (JP); Koji Sakata, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 260 days.

(21) Appl. No.: 11/429,344

(22) Filed: May 5, 2006

(65) Prior Publication Data

US 2006/0256507 A1 Nov. 16, 2006

(30) Foreign Application Priority Data

May 11, 2005 (JP) ............... 2005-138079

(51) Int. Cl.
*H01G 9/00* (2006.01)
*H01G 9/04* (2006.01)
*H01G 9/145* (2006.01)

(52) U.S. Cl. ............... 361/523; 361/528; 361/532
(58) Field of Classification Search ............... 361/523, 361/528–529, 532–540
See application file for complete search history.

(56) References Cited

U.S. PATENT DOCUMENTS 6,719,813 B2 * 4/2004 Kojima et al. ............... 29/25.03
6,870,728 B1 * 3/2005 Burket et al. ............... 361/538
6,980,416 B2 * 12/2005 Sakaguchi et al. ............... 361/523
2006/0018084 A1 * 1/2006 Saito et al. ............... 361/523

FOREIGN PATENT DOCUMENTS

JP 2002343686 11/2002

* cited by examiner

*Primary Examiner*—Eric Thomas
(74) *Attorney, Agent, or Firm*—Frishauf, Holtz, Goodman & Chick, P.C.

(57) ABSTRACT

In a solid electrolytic capacitor including a device portion having a cathode conductor layer and an anode conductor layer arranged on a sheet-like or a foil-like base member, a first insulating resin layer is formed on the cathode conductor layer and the anode conductor layer. A positive electrode mounting terminal layer is formed on the first insulating resin layer. An anode conductor portion penetrates the first insulating resin layer to electrically connect the positive electrode mounting terminal layer to the anode conductor layer. A plurality of negative electrode mounting terminal layers are arranged on the first insulating resin layer. A cathode conductor portion penetrates the first insulating resin layer to electrically connect the negative electrode mounting terminal layer to the cathode conductor layer. A second insulating resin layer is formed on the positive electrode mounting terminal layer. The second insulating resin layer has a plurality of first opening portions partially exposing the positive electrode mounting terminal layer.

20 Claims, 8 Drawing Sheets

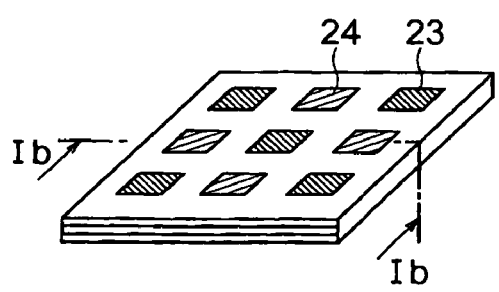
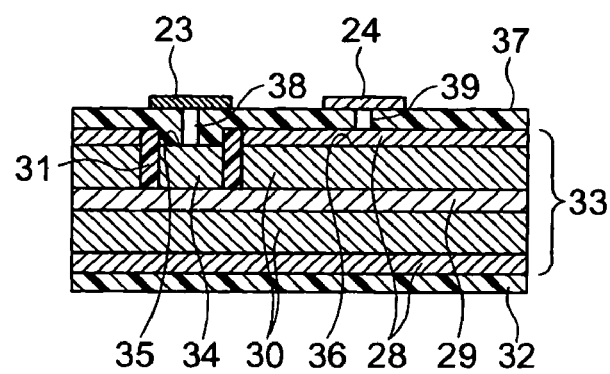
FIG. 1A
FIG. 1B (a)

(b)

SOLID ELECTROLYTIC CAPACITOR WHICH CAN EASILY BE LOWERED IN ESL

This application claims priority to prior Japanese patent application JP 2005-138079, the disclosure of which is incorporated herein by reference.

BACKGROUND OF THE INVENTION

The present invention relates to a solid electrolytic capacitor having a plurality of mounting terminals serving as electrodes.

Recently, devices and apparatuses in various fields are making progress towards a smaller size, a thinner profile, and a higher performance. As one of effective approaches therefor, it is proposed to use a high frequency as a driving frequency of a circuit. For example, in case of a solid electrolytic capacitor used as a power supply circuit of an apparatus, the capacitor must have a low inductance (hereinafter referred to as ESL (equivalent series inductance)) so as to be adapted to a high frequency.

The ESL is increased due to various factors, such as a permeability of a conductor inside the device, a wiring length from the inside of the device to mounting terminals, and a wiring pattern. In order to reduce the ESL, a distance between positive and negative mounting terminals is reduced so as to decrease an inductance component, called a loop inductance, produced between the positive and the negative terminals. Recently, use is frequently made of techniques of increasing the number of mounting terminals and disposing the positive and the negative terminals in one-dimensional alternate arrangement or in a two-dimensional staggered arrangement. Hereinafter, such a capacitor having an increased number of mounting terminals will be called a multi-terminal capacitor.

For example, the multi-terminal capacitor is disclosed in Japanese Unexamined Patent Application Publication (JP-A) No. 2002-343686 as a solid electrolytic capacitor. The solid electrolytic capacitor comprises a porous valve metal sheet member having one surface provided with a plurality of electrode portions, a dielectric film formed on a porous portion of the valve metal sheet member, a solid electrolyte layer formed on the dielectric film, and a power collector layer formed on the solid electrolyte layer. The solid electrolytic capacitor is provided with through holes extending between one side provided with the electrode portions and the other side provided with the power collector layer. Each of the through holes is filled with an insulator. At a center portion of the insulator, a conductor is disposed to be electrically connected to the power collector layer or the electrode portion.

In the above-mentioned solid electrolytic capacitor, the ESL is lowered as the number of the electrode portions increases. However, during processing for arranging the conductor at the center portion of the insulator, capacitor characteristics tend to be deteriorated. In addition, production is not easy and mass-production is difficult.

SUMMARY OF THE INVENTION

It is therefore an object of this invention to provide a solid electrolytic capacitor which is capable of reducing ESL without deterioration of characteristics.

It is another object of this invention to provide a solid electrolytic capacitor which can easily be produced.

Other objects of the present invention will become clear as the description proceeds.

According to a first aspect of the present invention, there is provided a solid electrolytic capacitor including a device portion comprising (a) an anode member having a base member made of a sheet-like or a foil-like valve metal having an enlarged surface and a dielectric layer formed on a surface of the base member and made of an oxide of a metal component of the base member, (b) an insulator layer isolating the anode member into a first region and a second region, and (c) a cathode conductor layer and (d) an anode conductor layer formed on the first and the second regions, respectively, said device portion having two principal surfaces opposite to each other, wherein at least one of the principal surfaces is provided with a composite layer composed of three layers including a first insulating resin layer, a positive electrode mounting terminal layer electrically connected to the anode conductor layer, and a second insulating resin layer, the second insulating resin layer being provided with a plurality of opening portions for partially exposing the positive electrode mounting terminal layer, the first insulating resin layer being provided with a plurality of first hole portions connecting the anode conductor layer with the positive electrode mounting terminal layer, the three layers being provided with a plurality of second hole portions penetrating the three layers to expose the cathode conductor layer and each having an inner wall surface coated with an insulating resin to prevent exposure of the positive electrode mounting terminal layer, the device portion being electrically connected to the outside through the first and the second hole portions.

According to a second aspect of the present invention, there is provided a solid electrolytic capacitor comprising a device portion having a cathode conductor layer and an anode conductor layer arranged on a sheet-like or a foil like base member, the device portion having two principal surfaces opposite to each other, and a composite layer disposed on at least one of the two principal surfaces, the composite layer including a first insulating resin layer, a positive electrode mounting terminal layer electrically connected to the anode conductor layer, and a second insulating resin layer, the second insulating resin layer being provided with a plurality of first hole portions partially exposing the positive electrode mounting terminal layer, the composite layer being provided with a plurality of second hole portions penetrating the composite layer in correspondence to the cathode conductor layer, each of the second hole portions having an inner wall surface coated with an insulating resin to prevent exposure of the positive electrode mounting terminal layer, the cathode conductor layer and the anode conductor layer being electrically connected to the outside through the first hole portions and the second hole portions, respectively.

According to a third aspect of the present invention, there is provided a solid electrolytic capacitor comprising a device portion having a cathode conductor layer and an anode conductor layer arranged on a sheet-like or a foil-like base member, a first insulating resin layer formed on the cathode conductor layer and the anode conductor layer, a positive electrode mounting terminal layer formed on the first insulating resin layer, an anode conductor portion penetrating the first insulating resin layer to electrically connect the positive electrode mounting terminal layer to the anode conductor layer, a plurality of negative electrode mounting terminal layers arranged on the first insulating resin layer, a cathode conductor portion penetrating the first insulating resin layer to electrically connect the negative electrode mounting terminal layer to the cathode conductor layer, and a second insulating resin layer formed on the positive electrode mounting terminal layer, the second insulating resin layer having a plurality of first opening portions partially exposing the positive electrode mounting terminal layer.

According to a fourth aspect of the present invention, there is provided a solid electrolytic capacitor comprising a device portion having a cathode conductor layer and an anode conductor layer arranged on a sheet-like or a foil-like base member, a negative electrode mounting terminal foil formed on the cathode conductor layer, a first insulating resin layer covering the negative electrode mounting terminal foil, a positive terminal mounting terminal foil electrically connected to the anode conductor layer and extending over the insulating resin layer, and a second insulating resin layer covering the first insulating resin layer and the positive electrode mounting terminal foil, the second insulating resin layer having a first opening portion partially exposing the positive electrode mounting terminal foil to form a positive electrode mounting terminal, the first and the second insulating resin layers having a second opening portion partially exposing the negative electrode mounting terminal foil to form a negative electrode mounting terminal.

According to a fifth aspect of the present invention, there is provided a solid electrolytic capacitor comprising a condenser element having two principal surfaces and a layer portion formed on at least one of the principal surfaces and made of at least one of a copper foil, an epoxy resin including glass, and a liquid crystal polymer, the condenser element having a particular surface does not formed with the layer portion, the condenser element comprising an anode member made of aluminum, a dielectric member on the anode member, conductive polymer materials on the dielectric member, and a cathode formed on the polymer materials, the particular surface being coated with an epoxy resin including glass or with a liquid crystal polymer.

BRIEF DESCRIPTION OF THE DRAWING

FIG. 1A is a perspective view of a characteristic part of a solid electrolytic capacitor obtained during research for this invention;

FIG. 1B is an enlarged sectional view taken along a line Ib-Ib in FIG. 1A;

DESCRIPTION OF THE PREFERRED EMBODIMENTS

Figure 2A:
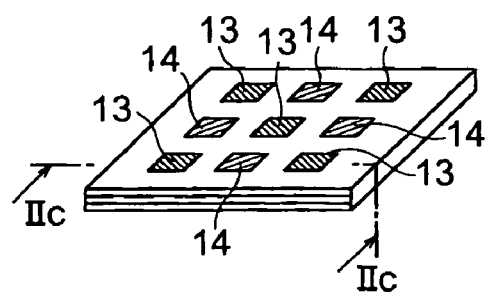
FIG. 2A is an external perspective view of a solid electrolytic capacitor according to a first embodiment of this invention.

In order to facilitate an understanding of this invention, description will at first be made of a multi-terminal capacitor of a solid electrolytic capacitor type obtained during research for this invention.

Referring to FIGS. 1A and 1B, the multi-terminal capacitor includes a device portion 33 comprising a center base metal 29, porous portions (which are already partially processed into a solid electrolyte layer in the illustrated state) 30 formed on upper and lower surfaces of the base metal 29, respectively, and cathode conductor layers 28 formed on the porous portions 30, respectively. On an upper side of the device portion 33, the porous portion 30 is processed into the solid electrolyte layer in the known manner in an area covered with the cathode conductor layer 28. In the remaining area of the porous portion 30 which is not covered with the cathode conductor layer 28, the porous portion 30 is exposed as an anode conductor layer or anode portion 34. On the anode portion 34, no solid electrolyte layer is formed. Most part of the upper and the lower surfaces of the base metal 29 are covered with an oxide film. However, a part of the oxide film is removed at the anode portion 34.

On a surface of the anode portion 34, a positive electrode copper layer 35 electrically connected to the base metal 29 is formed by copper foil welding or copper plating. On the upper side of the device portion 33, a copper foil is adhered to the cathode conductor layer 28 by a conductive adhesive to form a negative electrode copper layer 36. Further, on the positive and the negative electrode copper layers 35 and 36, an insulating resin layer 37 is formed. On the insulating resin layer 37, a positive electrode mounting terminal 23 and a negative electrode mounting terminal 24 are formed. The positive and the negative electrode mounting terminals 23 and 24 are electrically connected to the positive and the negative copper layers 35 and 36 through plating vias 38 and 39, respectively. On a lower side of the device portion 33, the cathode conductor layer 28 is covered with an insulating resin layer 32.

The above-mentioned multi-terminal capacitor does not require a through hole penetrating the device portion 33 so that a production process is simplified. Further, it is possible to avoid an adverse influence upon leakage current characteristics during formation of the through hole.

Now, referring to FIGS. 2A to 3C, description will be made of a multi-terminal capacitor of a solid electrolytic capacitor type according to a first embodiment of this invention.

Figure 3A:
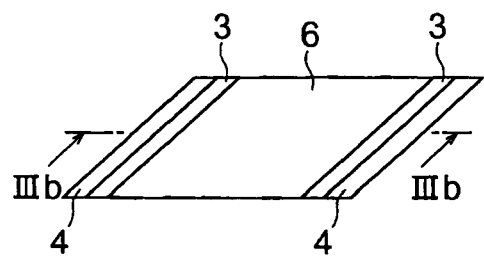
FIG. 3A is a perspective view of a device portion of the solid electrolytic capacitor illustrated in FIGS. 2A to 2C.
Figure 3B:
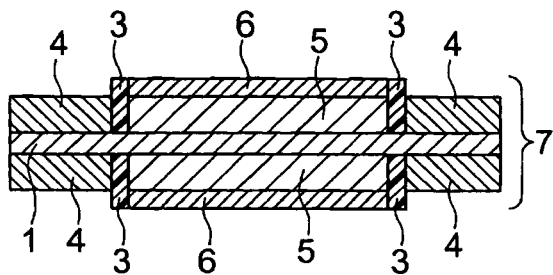
FIG. 3B is an enlarged sectional view taken along a line IIIb-IIIb in FIG. 3A.
Figure 3C:
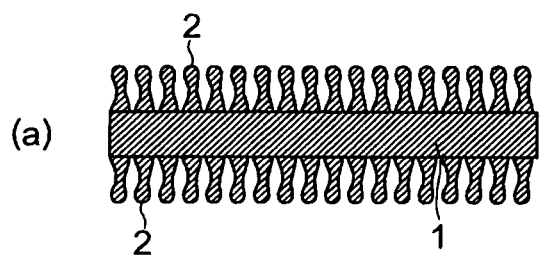
FIG. 3C is a schematic view for describing a process of treating a base metal upon forming the device portion illustrated in FIGS. 3A and 3B.
Figure 3C:
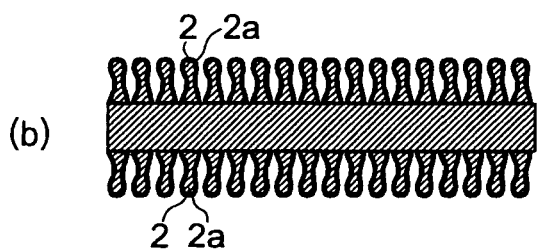
Figure 4A:
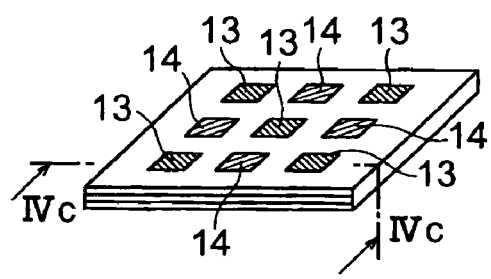
FIG. 4A is an external perspective view of a solid electrolytic capacitor according to a second embodiment of this invention.
Figure 4B:
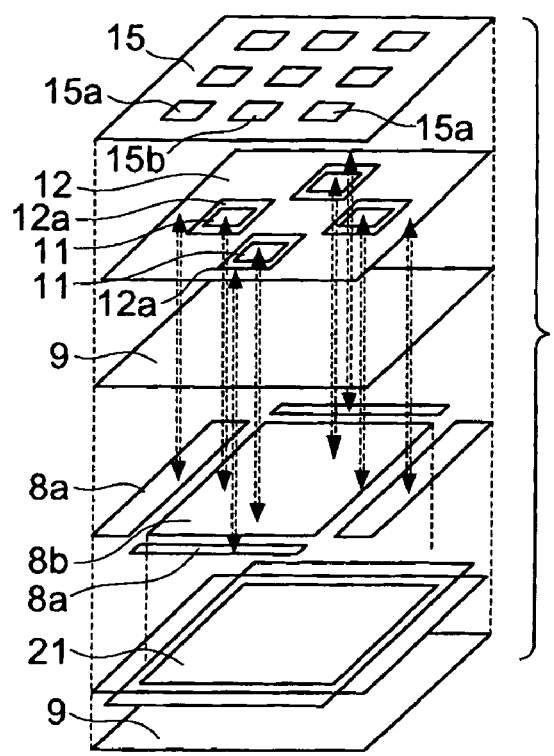
FIG. 4B is an exploded perspective view of the solid electrolytic capacitor illustrated in FIG. 4A.
Figure 4C:
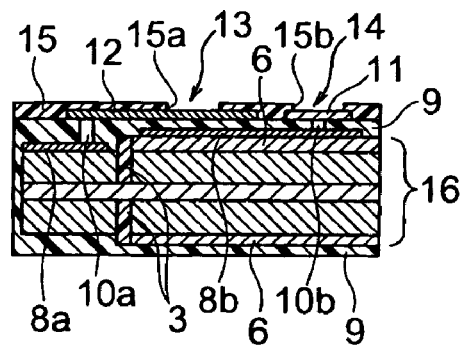
FIG. 4C is an enlarged partial sectional view taken along a line IVc-IVc in FIG. 4A.
Figure 5A:
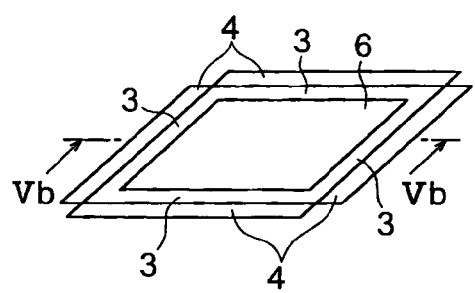
FIG. 5A is a perspective view of a characteristic part of the solid electrolytic capacitor illustrated in FIGS. 4A to 4C.
Figure 5B:
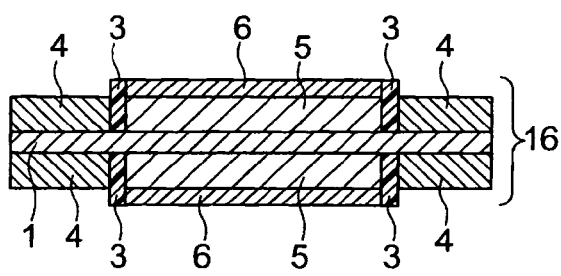
FIG. 5B is an enlarged sectional view taken along a line Vb-Vb in FIG. 5A.
Figure 6A:
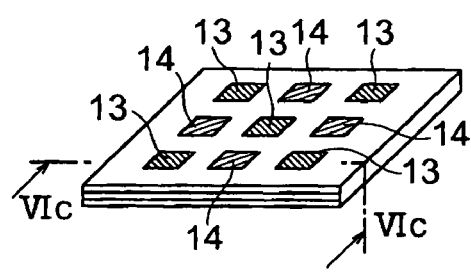
FIG. 6A is an external perspective view of a solid electrolytic capacitor according to a third embodiment of this invention.
Figure 6B:
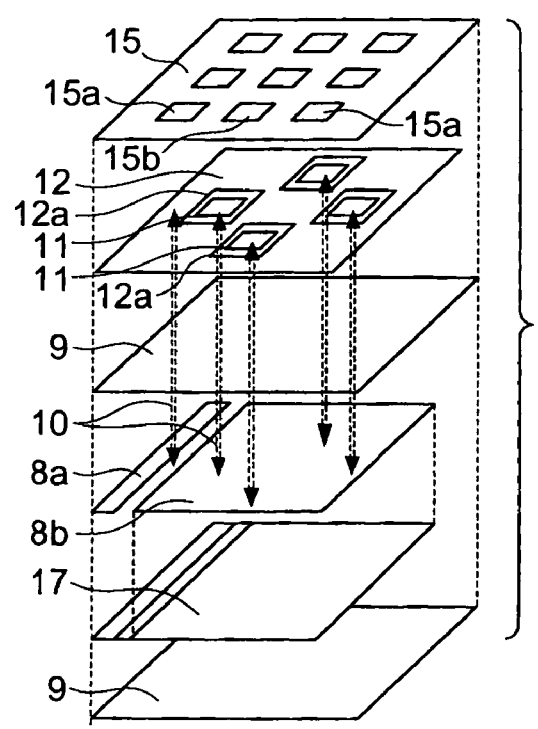
FIG. 6B is an exploded perspective view of the solid electrolytic capacitor illustrated in FIG. 6A.
Figure 6C:
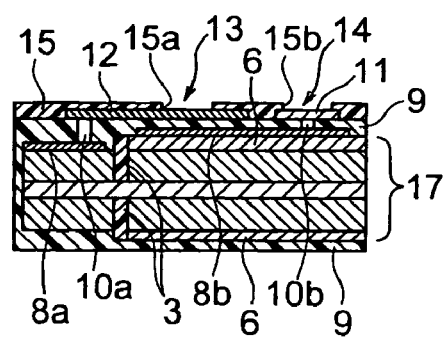
FIG. 6C is an enlarged partial sectional view taken along a line VIc-VIc in FIG. 6A.
Figure 7A:
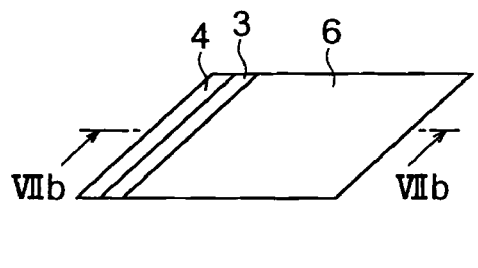
FIG. 7A is a perspective view of a characteristic part of the solid electrolytic capacitor illustrated in FIGS. 6A to 6C.
Figure 7B:
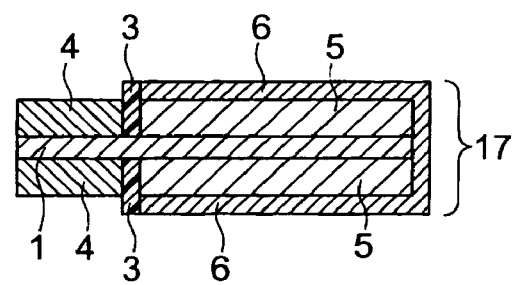
FIG. 7B is an enlarged sectional view taken along a line VIIb-VIIb in FIG. 6A.

The multi-terminal capacitor comprises a device portion 7 illustrated in FIGS. 3A and 3B. In order to produce the device portion 7, a base metal 1 comprising a sheet-like or a foil-like valve metal is at first prepared. The valve metal 1 is selected from aluminum, niobium, tantalum, and alloys thereof. Opposite surfaces of the base metal 1 are enlarged to form porous portions 2 schematically shown in FIG. 3C (*a*). Then, a dielectric layer 2*a* is formed as an oxide film on a surface of each of the porous portions 2 to form an anode member. A portion of the base metal 1 except the porous portions 2 will herein be called a base member.

As the base metal 1, use is made of a foil which is commercially available as a material of an aluminum electrolytic capacitor and which has a unit capacitance of 200 μF per square centimeter and a rated formation voltage of 9V required upon forming the oxide film. The foil is at first cut into a strip of 4 mm wide. On an aluminum portion exposed on a surface of the foil, an oxide film is formed again by anode oxidization. Then, the foil is cut to have a length of 7 mm. Thus, a rectangular foil having a long side of 7 mm and a short side of 4 mm corresponding to the device portion 7 is obtained.

On each of opposite surfaces of the rectangular foil, an epoxy-based resin is applied to areas inside by 1 mm from the short sides to have a width of 0.5 mm and a length equal to that of the short sides. The resin is infiltrated into the porous portion 2 and cured to form insulating resin portions 3. By the insulating resin portions 3, the porous portion 2 is electrically isolated into a first region at the center and second regions at opposite ends.

After forming the insulating resin portions 3, a solid electrolyte layer 5 of polypyrrole which is a conductive polymer is formed on the first region of the porous portion 2. On the solid electrolyte layer 5, a cathode conductor layer 6 of graphite, silver, or the like is formed. On the other hand, no solid electrolyte layer is formed on the second regions of the porous portion 2. Herein, each of the second regions of the porous portion 2 will be called an anode conductor layer or an anode portion 4.

The device portion 7 obtained via the above-mentioned steps has, as average characteristics, a capacitance of 25 μF at a measurement frequency of 120 Hz, an equivalent series resistance (hereinafter called ESR) of 15 mΩ at 100 kHz, and leakage current of 5 μA when a voltage of 4V is applied.

Figure 2B:
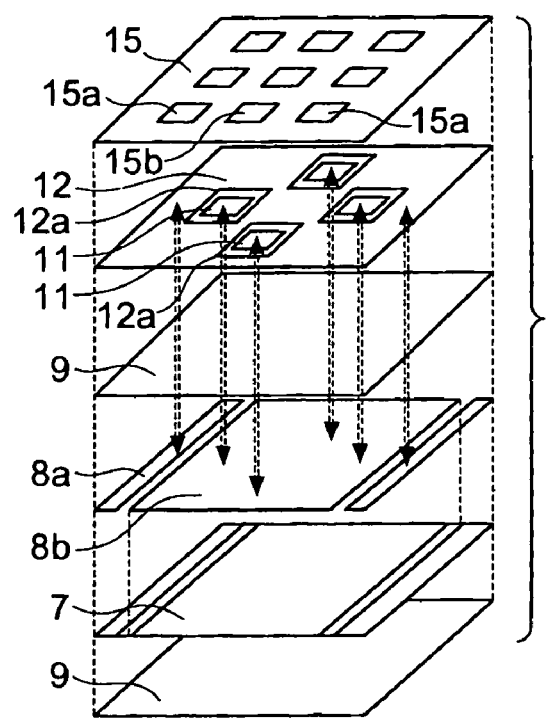
FIG. 2B is an exploded perspective view of the solid electrolytic capacitor illustrated in FIG. 2A.
Figure 2C:
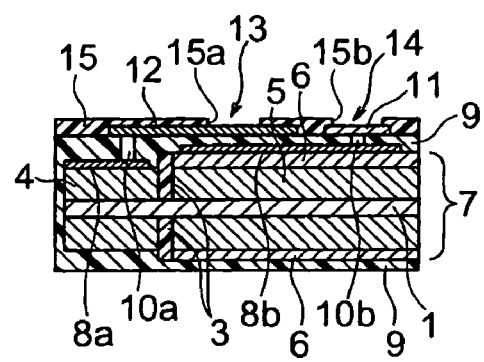
FIG. 2C is an enlarged partial sectional view taken along a line IIc-IIc in FIG. 2A.

Referring to FIGS. 2A to 2C, description will be made of a process of producing the multi-terminal capacitor by the use of the device portion 7 illustrated in FIGS. 3A and 3B.

At first, the oxide film of the anode portion 4 is partially removed. Then, copper layers 8*a* and 8*b* are formed on the anode portion 4 and the cathode conductor layer 6 of the device portion 7, respectively. Specifically, the copper layer 8*a* on the anode portion 4 is formed by resistance welding of a copper foil. The copper layer 8*b* on the cathode conductor layer 6 is adhered by a conductive adhesive using silver as a filler. The anode portion 4 has a width of about 0.9 mm so that the copper foil can easily be welded.

Then, the device portion 7 is sandwiched by a half-cured resin sheet containing epoxy resin as a main component. The half-cured resin sheet is heated to be cured under pressure to coat the device portion 7 with a packaging resin 9. Herein, the packaging resin 9 may be called a first insulating resin layer.

The packaging resin 9 is subjected to laser machining so that first hole portions reaching the copper layer 8*a* are formed at two positions in an area where positive electrode mounting terminals 13 are to be formed. In an area where negative electrode mounting terminals 14 are to be formed, second hole portions reaching the copper layer 8*b* are formed at a plurality of positions. In order to reduce the ESL, arrangement (positions and intervals) of the second hole portions is determined so that the second hole portions are adjacent to the positive electrode mounting terminals 13, respectively. Specifically, it is assumed that each mounting terminal itself has a size of 0.8 mm square and that the mounting terminals are arranged in a lattice fashion in an area of 3 mm square. In this case, the second hole portions corresponding to the negative mounting terminals 14 are arranged so that the mounting terminal having a center at a left upper corner of the area is the positive electrode mounting terminal 13 and that the mounting terminals adjacent to one another at a pitch of 1.5 mm are different in polarity. In this event, it should be noted that the first hole portions are not directly adjacent to one another at a minimum distance and that the second hole portions are not directly adjacent to one another at a minimum distance.

The above-mentioned hole portions formed by the laser machining and their neighborhoods are cleaned. Thereafter, plating vias (conductor portions) 10*a* and 10*b* are formed in the hole portions by copper plating. As will be described next, the positive and the negative electrode mounting terminals 13 and 14 are formed. Upon forming the plating vias 10*a* and 10*b*, a copper plating layer is formed entirely on the packaging resin 9 on the side where the mounting terminals are to be formed. Thereafter, the copper plating layer outside a 0.8 mm square area around the plating via 10*b* is removed by etching over a width of 0.2 mm to form a plurality of negative electrode mounting terminal layers 11. At this time, a remaining portion except a portion serving as the negative electrode mounting terminals 14 and a portion removed by etching becomes a single positive electrode mounting terminal layer 12. As a result, the positive electrode mounting terminal layer 12 has a plurality of window portions 12*a* and the negative electrode mounting terminal layers 11 are disposed at the window portions 12*a*, respectively.

Finally, on the positive and the negative electrode mounting terminal layers 12 and 11, a solder resist resin is printed as a second insulating resin layer. At this time, by the use of a printing pattern such that the positive electrode mounting terminal layer 12 and the negative electrode mounting terminal layers 11 are partially exposed, the positive and the negative electrode mounting terminals 13 and 14 are formed. Specifically, a printing screen is prepared so that each of the positive and the negative electrode mounting terminals 13 and 14 has a size of a 0.6 mm square. By the use of the printing screen, the resist resin is printed. After printing, the resist resin is heated and cured to form a solder resist layer 15. As a result, the solder resist layer 15 is provided with a plurality of first opening portions 15*a* through which the positive electrode mounting terminal layer 12 is partially exposed and a plurality of second opening portions 15*b* through which the negative electrode mounting terminal layers 14 are exposed, respectively. Thus, on an upper surface of the device portion 7, a composite layer comprising three layers, i.e., the packaging resin 9, the positive electrode mounting terminal layer 12, and the solder resist layer 15, is formed.

In the multi-terminal capacitor (solid electrolytic capacitor) mentioned above, connection of the positive electrode mounting terminal 13 and the base metal 1 of the device portion 7 can be established at an end portion of the device portion 7, which has a relatively wide area, irrespective of the pitch between the mounting terminals or the number of the mounting terminals.

In the foregoing, the number of the positive electrode mounting terminals 13 is equal to 5 and the number of the negative electrode mounting terminals 14 is equal to 4. Not being limited thereto, the number of these terminals may be appropriately changed as far as no processing problem is caused. In the foregoing, the number of the plating vias 10*a* for positive electrodes is equal to 2 and the number of the plating via 10b for each negative electrode is equal to 1. Not being limited thereto, the number of the plating vias 10a and 10b may be appropriately changed as far as no processing problem is caused. Although each of the positive and the negative electrode mounting terminals 13 and 14 is illustrated to have a squire shape, it can be designed to have one of a rectangular shape, a circular shape, and others by changing a printing pattern of a solder resist in the manner known in the art.

In the above-mentioned solid electrolytic capacitor, the copper foil is adhered on one surface of the cathode conductor layer 6. With this structure, it is readily possible by a laser working to lead out the terminals from the cathode conductor layer 6 to the mounding surface. In addition, a resistance value of the cathode conductor layer 6 can be lowered to thereby make an impedance become small at a high frequency side in the solid electrolytic capacitor.

It is preferable that the anode conductor layer 12 is made of a copper foil and extends mostly at a whole surface of the capacitor with excepting the negative electrode mounting terminals 14 and the insulating resin portion surrounding or coating each of the negative electrode mounting terminals 14. With this structure, it is possible to decrease an inductance at the high frequency side of the solid electrolytic capacitor.

The above-mentioned solid electrolytic capacitor will shortly be summarized by the use of other words.

The solid electrolytic capacitor comprises a capacitor element having two principal surfaces opposite to each other; a layer portion formed on at least one of the principal surfaces; and a coating portion coating a remaining surface of the capacitor element. The capacitor element comprises an anode member made of aluminum, a dielectric member on the anode member; conductive polymer materials on the dielectric member, and a cathode member formed on the polymer materials. The layer portion is made of one of an epoxy resin with glass and a liquid crystal polymer. The coating portion is made of at least one of a copper foil, an epoxy resin with glass, and a liquid crystal polymer.

In the solid electrolytic capacitor, the solid electrolytic capacitor has a coefficient of linear expansion being 16-30 ppm/° C. This is because the solid electrolytic capacitor comprises, as main components, an aluminum, a copper, an epoxy resin with glass, and a conductive resin or the like for the negative electrode, which have coefficients of thermal expansion being 23.1 ppm/° C., 16.5 ppm/, 15-17 ppm/° C., and about 40 ppm/° C., respectively.

Instead of the epoxy resin with glass, use may be made of a liquid crystal polymer being similar to the epoxy resin in a coefficient of thermal expansion. Also in a case where the liquid crystal polymer is used, an excellent mounting is obtained.

Next referring to FIGS. 4A to 5C, description will be made of a multi-terminal capacitor of a solid electrolytic capacitor type according to a second embodiment of this invention. Similar parts are designated by like reference numerals and description thereof will be omitted.

The multi-terminal capacitor has a device portion 16 different from the device portion 7 illustrated in FIGS. 3A and 3B in arrangement pattern of the insulating resin portion 3 and the cathode conductor layer 6. In this embodiment, the anode portion 4 surrounds the cathode conductor layer 6. By the use of the device portion 16, the multi-terminal capacitor illustrated in FIGS. 4A and 4B can be produced in the manner similar to the first embodiment. In the multi-terminal capacitor, the number of the copper layers 8a and 8b and the plating vias 10a and 10b connecting the positive electrode mounting terminal layer 12 and the device portion 16 can be increased.

Further, the copper layers 8a and 8b are increased in number to be adjacent to the anode portion 4. Therefore, loop inductance is further reduced.

Next referring to FIGS. 6A to 7C, description will be made of a multi-terminal capacitor of a solid electrolytic capacitor type according to a third embodiment of this invention. Similar parts are designated by like reference numerals and description thereof will be omitted.

The multi-terminal capacitor has a device portion 17 different from the device portion 7 illustrated in FIGS. 3A and 3B in arrangement pattern of the insulating resin portion 3 and the cathode conductor layer 6. In this embodiment, the anode portion 4 is present only at one end of the cathode conductor layer 6. By the use of the device portion 17, the multi-terminal capacitor illustrated in FIGS. 6A to 6C can be produced in the manner similar to the first embodiment. In the multi-terminal capacitor, the number of the copper layers 8a and 8b and the plating vias 10a and 10b connecting the positive electrode mounting terminal layer 12 and the device portion 17 is reduced. Therefore, a step of forming the copper layers 8a and 8b and the plating vias 10a and 10b can be simplified.

Figure 8A:
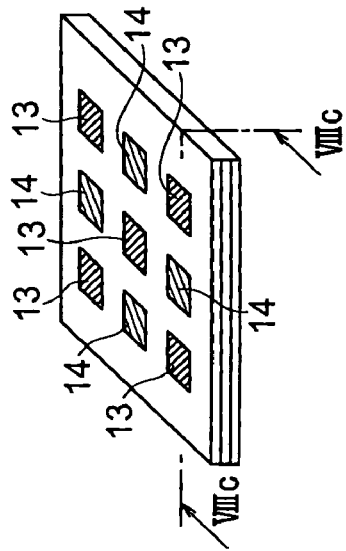
FIG. 8A is an external perspective view of a solid electrolytic capacitor according to a fourth embodiment of this invention.
Figure 8C:
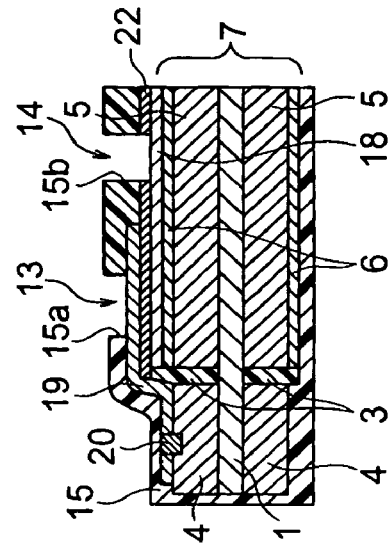
FIG. 8C is an enlarged partial sectional view taken along a line VIIIc-VIIIc in FIG. 8A.
Figure 8B:
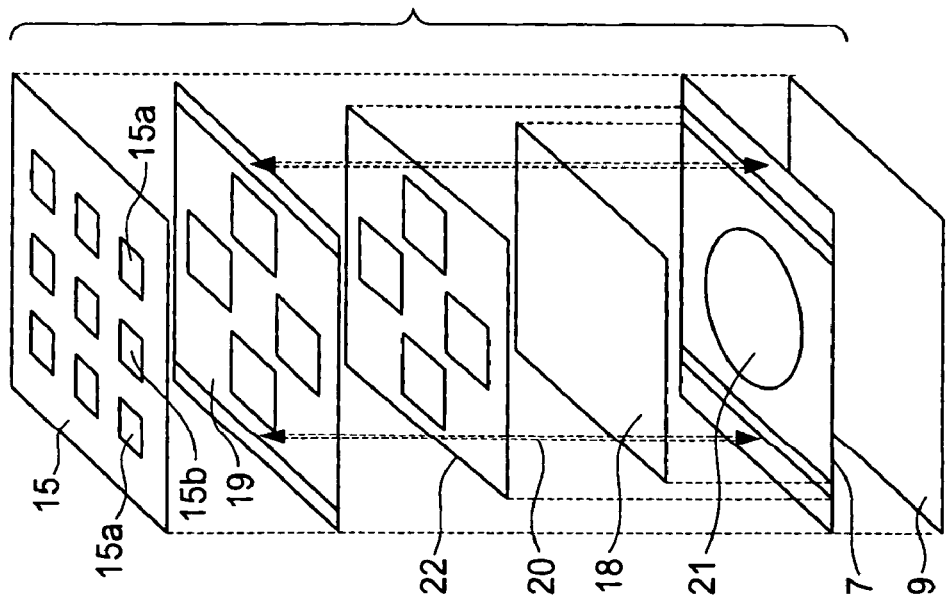
FIG. 8B is an exploded perspective view of the solid electrolytic capacitor illustrated in FIG. 8A.

Next referring to FIGS. 8A to 8C, description will be made of a multi-terminal capacitor of a solid electrolytic capacitor type according to a fourth embodiment of this invention. Similar parts are designated by like reference numerals and description thereof will be omitted.

In the multi-terminal capacitor, the device portion 7 illustrated in FIGS. 3A and 3B is used. However, the multi-terminal capacitor is different from the multi-terminal capacitor illustrated in FIGS. 2A to 2C in that the positive and the negative electrode mounting terminals layers 12 and 11 are replaced by a negative electrode mounting terminal foil 18 and a positive electrode mounting terminal foil 19 of a tin-plated copper foil 19, respectively, and that the plating vias 10 and 10b are replaced by a welding portion 20 and a conductive adhesive 21, respectively.

The multi-terminal capacitor can be provided in a manner generally similar to the first embodiment. However, each of the negative and the positive electrode mounting terminal foils 18 and 19 comprises the copper foil. As the negative electrode mounting terminal foil 18, the foil having an area substantially equal to that of the cathode conductor 6 of the device portion is used and adhered. Between the negative and the positive electrode mounting terminal foils 18 and 19, an insulating resin layer 22 is inserted. The insulating resin layer 22 is provided with a plurality of opening portions to partially expose the negative mounting terminal foil 18. Thus, the negative mounting terminals 14 are formed.

The above-mentioned multi-terminal capacitor does not require via formation and plating. Therefore, production facility and waste disposal can be simplified. Since the plated copper foil can be used as an anode-side copper layer, welding is easy. As the positive and the negative electrode mounting terminals 13 and 14, the positive and the negative electrode mounting terminal foils 19 and 18 are formed without being coated with the solder resist layer 15 and the insulating resin layer 22. Therefore, the negative mounting terminals 14 are slightly lower than a plane of the solder resist layer 15 to form a difference in height. A solder bump may be formed at this portion to reduce the difference in height so that a mountability is improved.

Although this invention has been described in conjunction with a few preferred embodiments thereof, this invention may be modified in various other manners.

What is claimed is:

1. A solid electrolytic capacitor including a device portion comprising (a) an anode member having a base member made of a sheet-like or a foil-like valve metal having an enlarged surface and a dielectric layer formed on a surface of the base member and made of an oxide of a metal component of the base member, (b) an insulator layer isolating the anode member into a first region and a second region, and (c) a cathode conductor layer and (d) an anode conductor layer formed on the first and the second regions, respectively, said device portion having two principal surfaces opposite to each other, wherein:

at least one of the principal surfaces is provided with a composite layer composed of three layers including a first insulating resin layer, a positive electrode mounting terminal layer electrically connected to the anode conductor layer, and a second insulating resin layer;

the second insulating resin layer being provided with a plurality of opening portions for partially exposing the positive electrode mounting terminal layer;

the first insulating resin layer being provided with a plurality of first hole portions connecting the anode conductor layer with the positive electrode mounting terminal layer;

the three layers being provided with a plurality of second hole portions penetrating the three layers to expose the cathode conductor layer and each having an inner wall surface coated with an insulating resin to prevent exposure of the positive electrode mounting terminal layer;

the device portion being electrically connected to the outside through the first and the second hole portions.

2. The solid electrolytic capacitor according to claim 1, wherein the first and the second hole portions have conductor portions formed inside thereof and electrically connected to the anode conductor layer and the cathode conductor layer, respectively, each of the first hole portions connecting the anode conductor layer with the positive electrode mounting terminal layer through each of the conductor portions, each of the second hole portions electrically exposing the cathode conductor layer to an outside of the solid electrolytic capacitor through each of the conductor portions to thereby electrically connect the anode conductor layer and the cathode conductor layer to the outside.

3. The solid electrolytic capacitor according to claim 1, wherein the opening portions are not directly adjacent to one another at a minimum distance and the second hole portions are not directly adjacent to one another at a minimum distance.

4. The solid electrolytic capacitor according to claim 1, wherein the valve metal is selected from aluminum, niobium, tantalum and alloys thereof.

5. The solid electrolytic capacitor according to claim 1, wherein said anode conductor layer extends mostly at a whole surface of the capacitor with excepting the second hole portions and the insulating resin coating each of the second hole portions.

6. The solid electrolytic capacitor according to claim 1, wherein the anode conductor layer is made of a copper and positioned on at least one of the principal surfaces.

7. A solid electrolytic capacitor comprising:
a device portion having a cathode conductor layer and an anode conductor layer arranged on a sheet-like or a foil like base member, the device portion having two principal surfaces opposite to each other; and
a composite layer disposed on at least one of the two principal surfaces;
the composite layer including:
a first insulating resin layer;
a positive electrode mounting terminal layer electrically connected to the anode conductor layer; and
a second insulating resin layer,
the second insulating resin layer being provided with a plurality of first hole portions partially exposing the positive electrode mounting terminal layer,
the composite layer being provided with a plurality of second hole portions penetrating the composite layer in correspondence to the cathode conductor layer,
each of the second hole portions having an inner wall surface coated with an insulating resin to prevent exposure of the positive electrode mounting terminal layer,
the cathode conductor layer and the anode conductor layer being electrically connected to the outside through the first hole portions and the second hole portions, respectively.

8. The solid electrolytic capacitor according to claim 7, wherein the base member comprises a sheet-like or a foil-like valve metal having an enlarged surface and a dielectric layer formed on a surface of the valve metal and made of an oxide of the valve metal.

9. The solid electrolytic capacitor according to claim 8, wherein the device portion includes a solid electrolyte layer formed on the dielectric layer, the cathode conductor layer being disposed on the solid electrolyte layer.

10. The solid electrolytic capacitor according to claim 9, wherein the device portion includes an insulator layer isolating a surface portion of the valve metal into a first region and a second region, the anode conductor layer being formed on the second region, the solid electrolyte layer being formed on the first region.

11. The solid electrolytic capacitor according to claim 7, wherein the first hole portions and the second hole portions have conductor portions formed inside thereof and electrically connected to the anode conductor layer and the cathode conductor layer, respectively, the device portion being electrically connected to the outside through the conductor portions.

12. A solid electrolytic capacitor comprising:
a device portion having a cathode conductor layer and an anode conductor layer arranged on a sheet-like or a foil-like base member;
a first insulating resin layer formed on the cathode conductor layer and the anode conductor layer;
a positive electrode mounting terminal layer formed on the first insulating resin layer;
an anode conductor portion penetrating the first insulating resin layer to electrically connect the positive electrode mounting terminal layer to the anode conductor layer;
a plurality of negative electrode mounting terminal layers arranged on the first insulating resin layer;
a cathode conductor portion penetrating the first insulating resin layer to electrically connect the negative electrode mounting terminal layer to the cathode conductor layer; and
a second insulating resin layer formed on the positive electrode mounting terminal layer, the second insulating resin layer having a plurality of first opening portions partially exposing the positive electrode mounting terminal layer.

13. The solid electrolytic capacitor according to claim 12, wherein the second insulating resin layer extends to an area above the negative electrode mounting terminal layer and has a plurality of second opening portions exposing the negative electrode terminal layers, respectively.

14. The solid electrolytic capacitor according to claim 12, wherein the positive electrode mounting terminal layer has a plurality of window portions, the negative electrode mounting terminal layers being disposed at the window portions, respectively.

15. The solid electrolytic capacitor according to claim 14, wherein the second insulating resin layer has a portion interposed between each of the negative electrode mounting terminal layers and the positive electrode mounting terminal layer.

16. The solid electrolytic capacitor according to claim 12, wherein the device portion has a solid electrolyte layer between the cathode conductor layer and the base member.

17. The solid electrolytic capacitor according to claim 16, wherein the device portion has an insulator layer between the anode conductor layer and each of the cathode conductor layer and the solid electrolyte layer.

18. A solid electrolytic capacitor comprising:
- a device portion having a cathode conductor layer and an anode conductor layer arranged on a sheet-like or a foil-like base member;
- a negative electrode mounting terminal foil formed on the cathode conductor layer;
- a first insulating resin layer covering the negative electrode mounting terminal foil;
- a positive terminal mounting terminal foil electrically connected to the anode conductor layer and extending over the insulating resin layer; and
- a second insulating resin layer covering the first insulating resin layer and the positive electrode mounting terminal foil, the second insulating resin layer having a first opening portion partially exposing the positive electrode mounting terminal foil to form a positive electrode mounting terminal, the first and the second insulating resin layers having a second opening portion partially exposing the negative electrode mounting terminal foil to form a negative electrode mounting terminal.

19. The solid electrolytic capacitor according to claim 18, wherein the device portion has a solid electrolyte layer between the cathode conductor layer and the base member.

20. The solid electrolytic capacitor according to claim 18, wherein the positive electrode mounting terminal foil is welded to the anode conductor layer.

\* \* \* \* \*